Figure 1:
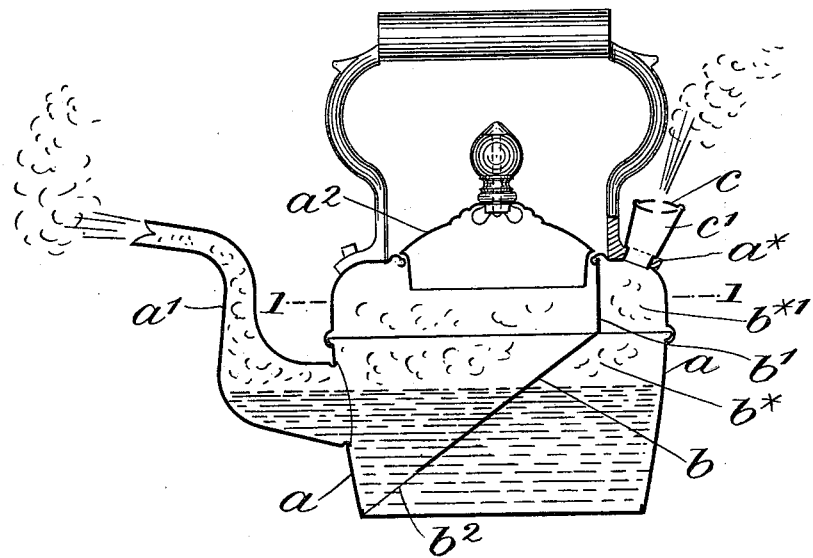

(No Model.) 2 Sheets—Sheet 1.

H. R. S. MAITLAND.
ALARM OR BRONCHITIS KETTLE.

No. 544,233. Patented Aug. 6, 1895.

Attest:
Walter E. Allen.
S. Allen.

Inventor:
Henry R. S. Maitland
by Knight Bros.
Attorneys.

(No Model.)                    H. R. S. MAITLAND.           2 Sheets—Sheet 2.
                            ALARM OR BRONCHITIS KETTLE.
No. 544,233.                                    Patented Aug. 6, 1895.
Fig: 3.
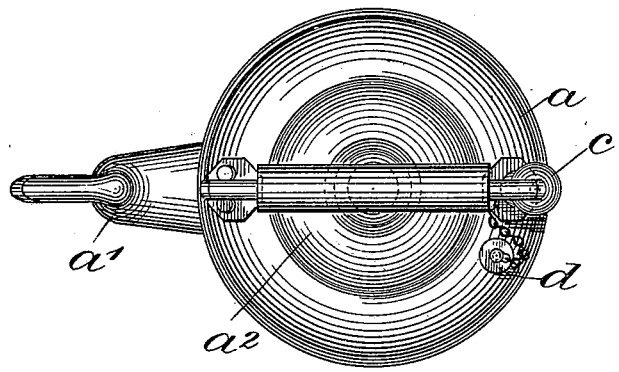
Fig: 4.
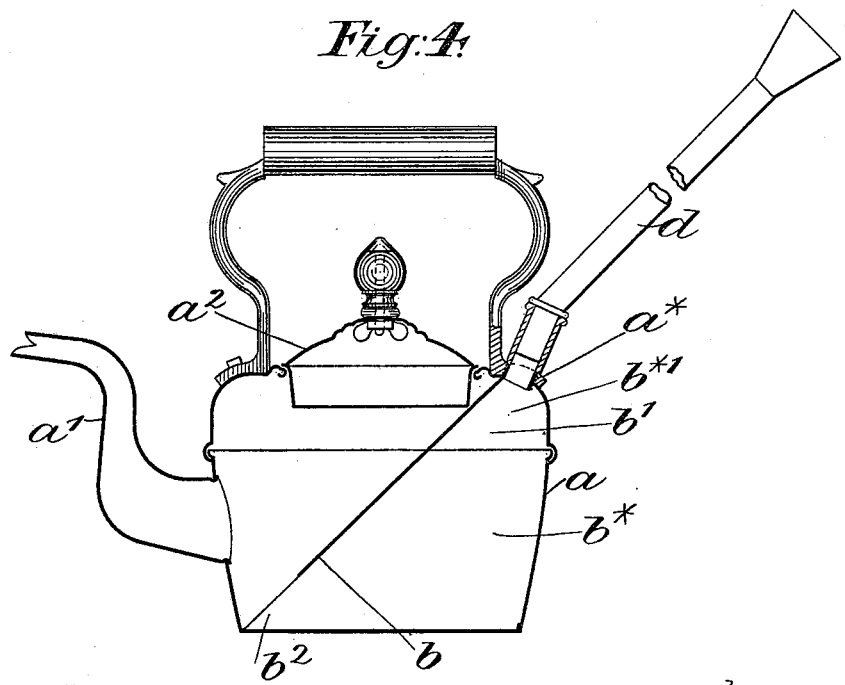
Attest:  
Walter E. Allen  
S. Allen
Inventor:  
Henry R. S. Maitland  
by Knight Bros.  
Attorneys.

UNITED STATES PATENT OFFICE.

HENRY ROTHES STEWART MAITLAND, OF BATH, ENGLAND.

ALARM OR BRONCHITIS KETTLE.

SPECIFICATION forming part of Letters Patent No. 544,233, dated August 6, 1895.

Application filed April 14, 1894. Serial No. 507,588. (No model.)

*To all whom it may concern:*

Be it known that I, HENRY ROTHES STEWART MAITLAND, a lieutenant in the Princess of Wales' Own Yorkshire Regiment, a subject of the Queen of Great Britain, residing at Perrymead House, Bath, in the county of Somerset, England, have invented certain new and useful Improvements in Alarm and Bronchitis Kettles, of which the following is a specification.

The invention relates primarily to alarm kettles, and has for its object to give an audible indication when the water within the kettle is at boiling-point.

It is generally considered desirable, in order to obtain the best results, that water employed in the preparation of infusions of tea or the like should only reach the boiling-point and should not be allowed to boil for any great length of time, and many attempts have been made to devise a means by which a suitable indication will be given when the proper point of boiling is reached, but they have all been more or less failures, principally for the reason that the volume of steam created, extending over such a large area and with so many ways of escape as are to be found in an ordinary kettle, had not the necessary force or volume to give the required audible indication.

A further objectionable feature of alarm-kettles as hitherto constructed has been that the lid was required to fit tightly, so as to confine the steam in order to cause the whistle to sound, and the volume of steam generated would generally force the water out of the spout in addition to sounding the whistle, and it was also necessary to fix the spout of the kettle very low down, so as to insure the water inside the kettle rising above the interior opening of the spout or the kettle required to be filled with a larger quantity of water than was at times required.

Now, according to the present invention, the kettle, in a simple and inexpensive manner, is so constructed that the steam resulting from the boiling of the water is collected independently of the lid and the spout and ultimately conveyed through a narrow channel or chamber to the signal or alarm device, and the concentration of the vapor in this manner completely overcomes the difficulties above pointed out.

The kettle may also be usefully employed as a bronchitis kettle, as hereinafter pointed out.

In carrying the present invention into effect the kettle is provided with a transverse partition or diaphragm, which extends from the top of the kettle near to the back thereof and beyond the lid downward a short distance in a vertical direction, then forward in an inclined direction to or near to the bottom of the kettle at the front thereof, but certainly below the spout. This partition or diaphragm is soldered to the interior of the kettle all round, so as to make a tight joint, while at its lower end it is notched or formed with a semicircular or other opening to admit of the circulation of the water.

In lieu of the arrangement lastly hereinbefore described the diaphragm may be carried in an inclined direction from the top of the kettle to the bottom or front thereof. A collecting-chamber is thus formed underneath and at the back of the diaphragm, and by reason of the peculiar formation thereof the steam from nearly the entire heating-surface of the kettle is collected therein. It is only necessary that the water should cover the opening of the partition or diaphragm, so that the collecting-chamber is independent of the lid and the spout, and the former may therefore fit loosely and the latter may be placed in almost any position.

At the upper part of the collecting-chamber, in the top of the kettle, is formed an opening, which is preferably surrounded by a screw or other fitting, into which is screwed a short tube carrying at its upper part a simple form of whistle or it might be a reed or a combination of reeds and the tube might be soldered in position, so that the whole of the steam collected in the channel passes through the tube and out by the whistle, by which arrangement immediately that the water boils the steam is collected in the chamber and a considerable volume thereof is caused to pass through and powerfully sound the whistle or other alarm.

If desired, an opening, closed by a screw-stopper or valve, may be provided at the upper part of the chamber, so that when it is desired that the alarm shall not be sounded the opening may be unclosed.

In order that the said invention may be more clearly understood and readily carried into effect, I will proceed, aided by the accompanying drawings, more fully to describe the same.

Figure 2:
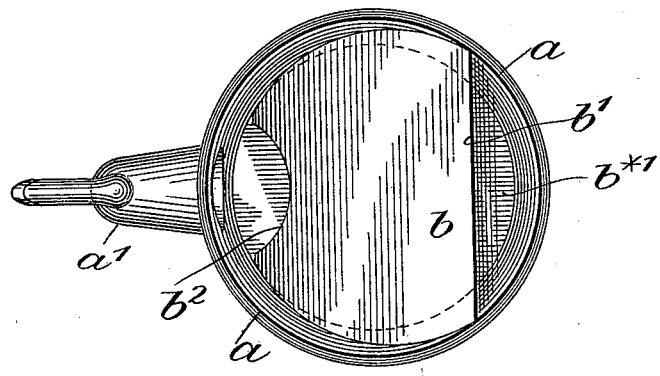

Figure 1 is a vertical longitudinal section of a kettle having the present invention applied thereto. Fig. 2 is a horizontal section thereof, taken on the line 1 1 of Fig. 1. Fig. 3 is a plan thereof; and Fig. 4 is a similar view to Fig. 1, but showing a modified form of diaphragm and representing the kettle adapted for use as a bronchitis-kettle.

In the several figures like parts are indicated by similar letters of reference.

Referring to Figs. 1 to 3, $a$ represents the body of the kettle.

$a'$ represents the spout, which is constructed and arranged in the ordinary manner, and $a^2$ represents the lid, which is also of ordinary construction and loosely fitting.

According to the present invention the kettle is provided with a transverse partition or diaphragm $b$, which extends from the top of the kettle near to the back thereof and beyond the lid $a^2$, downward a short distance in a vertical direction, as indicated at $b'$, then forward in an inclined direction, as indicated at $b$, to or near to the bottom of the kettle at the front thereof, but certainly below the junction of the spout $a'$ with the body $a$ of the kettle. This partition or diaphragm $b$ is soldered or otherwise fastened to the interior of the kettle all round, so as to make a tight joint, while at its lower end it is notched or provided with a semicircular or other opening $b^2$ to admit of the circulation of the water. A collecting-chamber $b^*$ is thus formed underneath and at the back of the diaphragm $b$, which gradually narrows in an upward direction and terminates in a steam-chamber $b^{*\prime}$ having parallel sides, and by reason of the peculiar formation of the chamber $b^*$ the steam from nearly the entire heating-surface of the kettle is collected in the steam-chamber $b^{*\prime}$. It is only necessary that the water should cover the opening $b^2$ of the partition or diaphragm $b$, so that the chamber $b^*$ is independent of the lid $a^2$ and spout $a'$, and the former may therefore fit loosely and the latter may be placed in almost any position.

At the upper part of the steam-chamber $b^{*\prime}$ and in the top of the kettle is formed an opening, which is preferably surrounded by a screw, or it might be any other suitable fitting $a^*$, which is fixed with the top of the kettle and into which is screwed a short tube $c'$, in the upper end of which is fixed a simple form of whistle $c$, or it might be a reed or a combination of reeds, so that the whole of the steam collected in the chamber $b^*$ passes through the tube $c'$ and out by the whistle $c$, by which arrangement immediately that the water boils the steam is collected in the chamber $b^{*\prime}$ and a considerable volume thereof is caused to pass through and powerfully sound the whistle $c$ or other alarm.

It is desirable that the kettle be filled up to a point above the circulation-way $b^2$ of the partition, in order to seal the same and prevent the escape therethrough of any portion of the steam collected in the chamber $b^*$.

In lieu of the screw or other fitting $a^*$ the tube $c'$ may be soldered to the kettle. In some cases a second opening, closed by a screw-stopper or valve $d$, is formed at the upper part of the steam-chamber $b^{*\prime}$, so that when it is desired that the alarm shall not be sounded the opening may be unclosed and the steam allowed to pass freely away.

In lieu of forming the diaphragm $b$ with a vertical part $b'$, as hereinbefore described, the entire diaphragm $b$ may be carried in an inclined direction from the top of the kettle to the bottom or front thereof, as represented in Fig. 4.

By the means hereinbefore described I obtain at a very small additional cost a kettle which will give a powerful alarm immediately that the water boils, and furthermore by reason of the peculiar arrangement of the parts, there is little or no tendency for the contained water to boil over should the kettle be filled almost to the highest point.

In the example given at Fig. 4, which represents the kettle adapted for use as a bronchitis-kettle, the whistle $c$ and its tube $c'$ are removed and an ordinary bronchitis-tube $d$ and mouthpiece $d'$, intended to facilitate the inhalation of steam, is screwed into the fitting $a^*$ in substitution therefor, such devices for convenience being made interchangeable.

The device is especially valuable as a bronchitis-kettle by reason of the large volume of steam collected by the chamber $b^*$.

Having now particularly described and ascertained the nature of my said invention and in what manner the same is to be performed, I declare that what I claim is—

1. A kettle comprising an internal steam collecting chamber extending at its lower end over the entire area of the bottom of the kettle or nearly so, and at its upper end terminating in a contracted part, an escape opening in the top of the kettle connected with the contracted part of the steam collecting chamber and adapted to receive an alarm device or the like, and an opening or circulation way between the bottom of the chamber and the body of the kettle; substantially as described.

2. A kettle comprising a partition or diaphragm extending from the upper part of the kettle at one side of the lid thereof to or near the bottom of the kettle at the other side thereof, forming a steam collecting chamber extending at its lower end over the entire area of the bottom of the kettle or nearly so, and at its upper end terminating in a contracted part, an escape opening in the top of the kettle connected with the contracted part of the steam collecting chamber and adapted to receive an alarm device or the like, and an opening or circulation way at the bottom of the partition or diaphragm between the chamber and the body of the kettle; substantially as described.

3. A kettle constructed with a partition or diaphragm extending from the upper part of the kettle at the rear of the lid downward at an inclination to the front of the kettle at or near the bottom thereof, a circulation way at the lower part of the partition and an alarm device in the upper part of the kettle behind the partition and adapted to be operated by the steam, substantially as herein shown and described and for the purpose stated.

HENRY ROTHES STEWART MAITLAND.

Witnesses:
C. W. RUDWAY,
CHARLES JOHN DAVIS.